(12) United States Patent
Burchett et al.

(10) Patent No.: US 8,162,085 B2
(45) Date of Patent: Apr. 24, 2012

(54) HYDRO-MECHANICAL CLUTCH FOR A HYBRID TRANSMISSION AND METHOD FOR OPERATING THE SAME

(75) Inventors: Douglas Scott Burchett, Indianapolis, IN (US); Kenneth D. Schoch, Greenwood, IN (US); Kevin C. Beckner, Indianapolis, IN (US); Michael D. Foster, Carmel, IN (US)

(73) Assignee: GM Global Technologies Operations LLC

( * ) Notice: Subject to any disclaimer, the term of this patent is extended or adjusted under 35 U.S.C. 154(b) by 399 days.

(21) Appl. No.: 12/427,844

(22) Filed: Apr. 22, 2009

(65) Prior Publication Data
US 2010/0155159 A1 Jun. 24, 2010

Related U.S. Application Data

(60) Provisional application No. 61/140,669, filed on Dec. 24, 2008.

(51) Int. Cl.
*B60W 20/00* (2006.01)
(52) U.S. Cl. .................. 180/65.275; 475/269
(58) Field of Classification Search ............ 180/65.235, 180/65.6, 65.265, 65.21, 65.275; 475/5, 475/269; 74/339, 340; 192/34.6, 70.23
See application file for complete search history.

(56) References Cited

U.S. PATENT DOCUMENTS

| | | | |
|---|---|---|---|
| 6,571,654 B2 * | 6/2003 | Forsyth | 74/339 |
| 6,672,180 B2 * | 1/2004 | Forsyth | 74/339 |
| 6,948,604 B2 * | 9/2005 | Puiu | 180/249 |
| 7,002,267 B2 * | 2/2006 | Raszkowski et al. | 180/65.235 |
| 7,189,182 B2 * | 3/2007 | Stevenson et al. | 475/292 |
| 7,194,350 B2 * | 3/2007 | Bansbach et al. | 701/67 |
| 7,204,166 B2 * | 4/2007 | Gochenour | 74/340 |
| 7,281,617 B2 * | 10/2007 | Puiu | 180/249 |
| 7,337,886 B2 * | 3/2008 | Puiu | 192/70.23 |
| 7,896,146 B2 * | 3/2011 | Pritchard et al. | 192/84.6 |
| 2006/0199697 A1 * | 9/2006 | Kirkwood et al. | 477/5 |
| 2009/0250307 A1 * | 10/2009 | Reed et al. | 475/269 |

FOREIGN PATENT DOCUMENTS
CN 101029663 A 9/2007

OTHER PUBLICATIONS
U.S. Appl. No. 12/427,987, filed Apr. 2009, Burchett et al.

* cited by examiner

*Primary Examiner* — Hau Phan

(57) ABSTRACT

A clutch assembly and method of operating the clutch assembly to start an engine of a hybrid vehicle includes a first clutch and a first clutch actuator for selectively engaging the first clutch. The first actuator has a first at-rest position engaging the clutch and a hydraulically charged position disengaged from the first clutch. The clutch assembly further includes a second clutch actuator having a second at-rest position away disengaged from the first clutch and a second hydraulically charged position engaged with the first clutch.

20 Claims, 6 Drawing Sheets

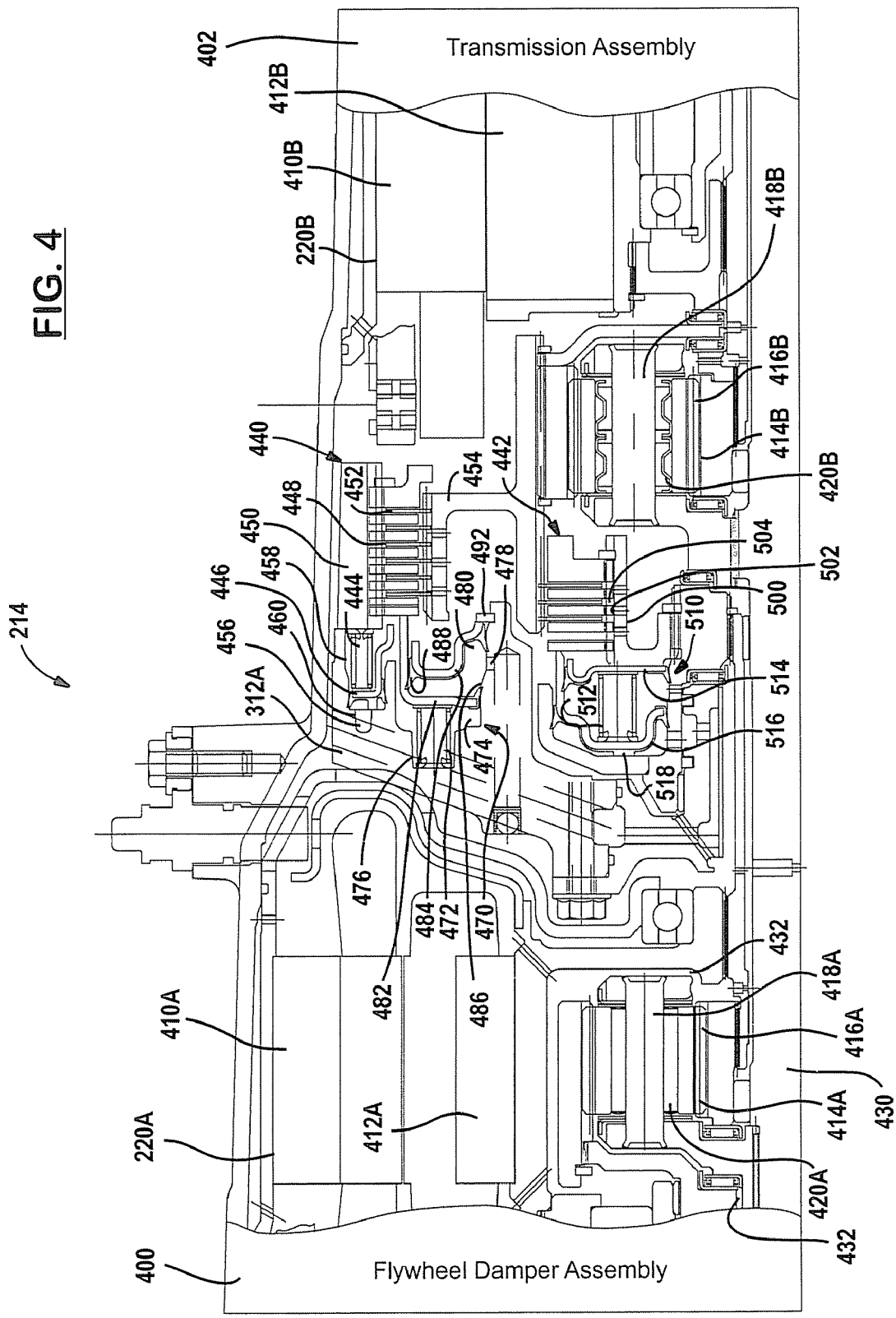

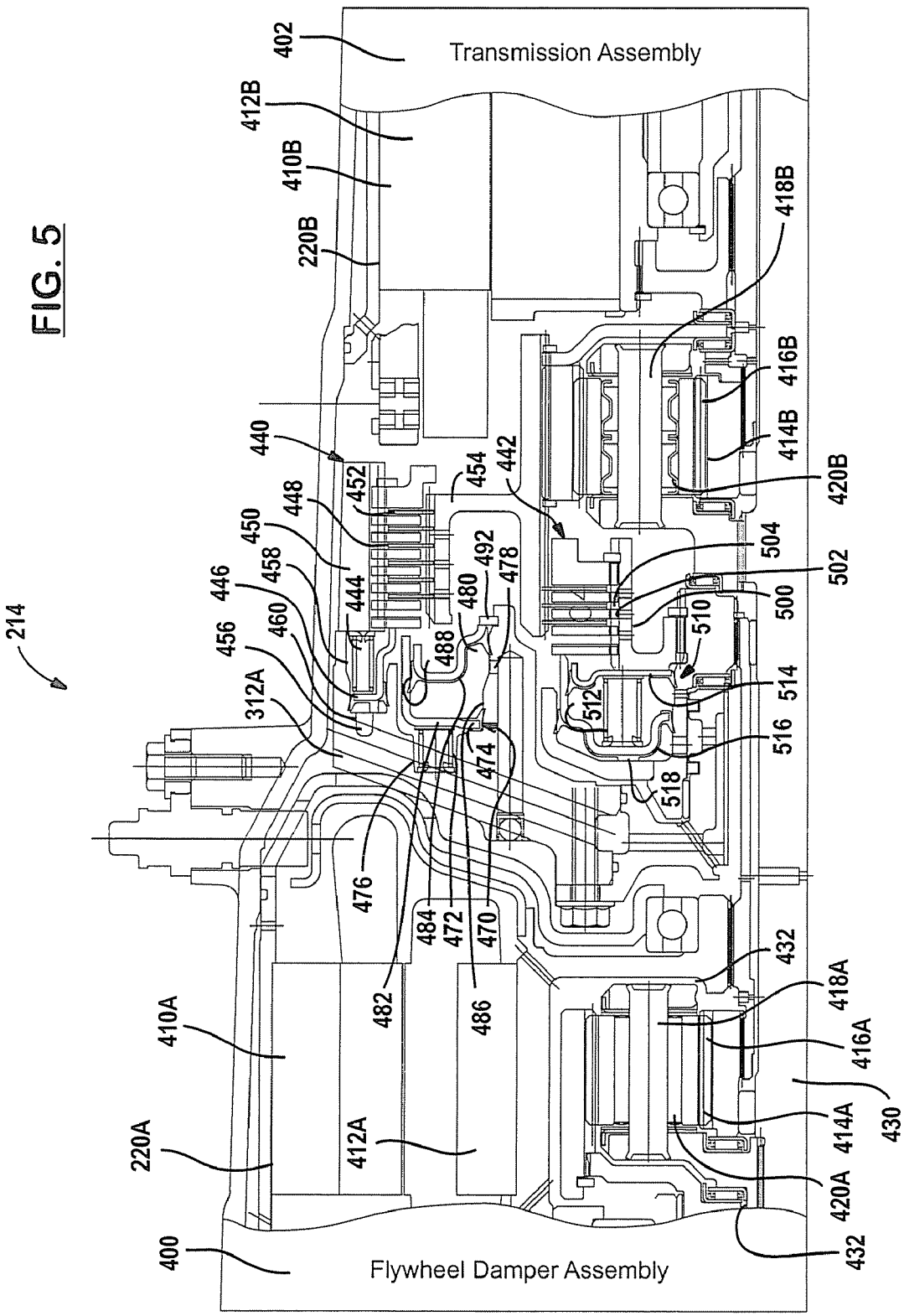

HYDRO-MECHANICAL CLUTCH FOR A HYBRID TRANSMISSION AND METHOD FOR OPERATING THE SAME

CROSS-REFERENCE TO RELATED APPLICATIONS

This application claims the benefit of U.S. Provisional Application No. 61/140,669, filed on Dec. 24, 2008. The disclosure of the above application is incorporated herein by reference.

FIELD

The present invention relates generally to transmissions and, more particularly, to a clutch configuration for use in a hybrid transmission

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Hybrid vehicles are increasing in popularity. Hybrid vehicles generally have two power sources. The internal combustion engine is a first power source and an electric motor is a second power source. The electric motor is used as a power source in city driving where vehicle kinetic energy can be recovered by regenerative braking, converted to electric and chemical form, and stored in a battery, from which the motor is driven. The internal combustion engine is most suitable in highway driving, during which wheel braking and opportunities for energy recovery are infrequent, and the engine operates at its greatest efficiency.

In mixed driving conditions, the electric motor and combustion engine may be used together to transmit power to a transmission input shaft, depending on driving conditions and the magnitude of the battery capacity.

Typically, an engine includes a separate starter motor used for starting the engine when the engine is stopped. Reducing the amount of components in a vehicle reduces the vehicle weight and, therefore, increases the overall range or gas mileage of the vehicle.

SUMMARY

The present disclosure eliminates a conventional starter motor from the vehicle and uses the hybrid electric motor and actuators to start the engine of the vehicle.

In one aspect of the disclosure, a clutch assembly includes a clutch assembly including a first housing comprising a first clutch, a first clutch actuator and a second housing having the first clutch actuator at least partially disposed therein so that said first clutch actuator selectively engages the first clutch.

The clutch assembly may be incorporated into a transmission having at least one electric motor therein. the motors may be used to operate a hybrid electric vehicle.

In one aspect of the disclosure, a clutch assembly includes a first clutch and a first clutch actuator for selectively engaging the first clutch. The first actuator has a first at-rest position engaging the clutch and a hydraulically charged position disengaged from the first clutch. The clutch assembly further includes a second clutch actuator having a second at-rest position away disengaged from the first clutch and a second hydraulically charged position engaged with the first clutch.

In a further aspect of the disclosure, a method of starting a vehicle having an engine includes engaging a first clutch in a transmission with a first clutch actuator when the engine is not started, starting the engine, generating a hydraulic force to move the first clutch actuator after starting the engine, and operating the transmission with a second clutch actuator.

Further areas of applicability of the present disclosure will become apparent from the detailed description provided hereinafter. It should be understood that the detailed description and specific examples are intended for purposes of illustration only and are not intended to limit the scope of the disclosure.

DESCRIPTION OF THE DRAWINGS

The present disclosure will become more fully understood from the detailed description and the accompanying drawings, wherein:

FIG. 4 is a cutaway view of a transmission wherein the transmission is in the off state and the transmission is starting the engine;

FIG. 5 is a cutaway view of a transmission for the clutch positions after starting of the vehicle;

DETAILED DESCRIPTION

Figure 1:
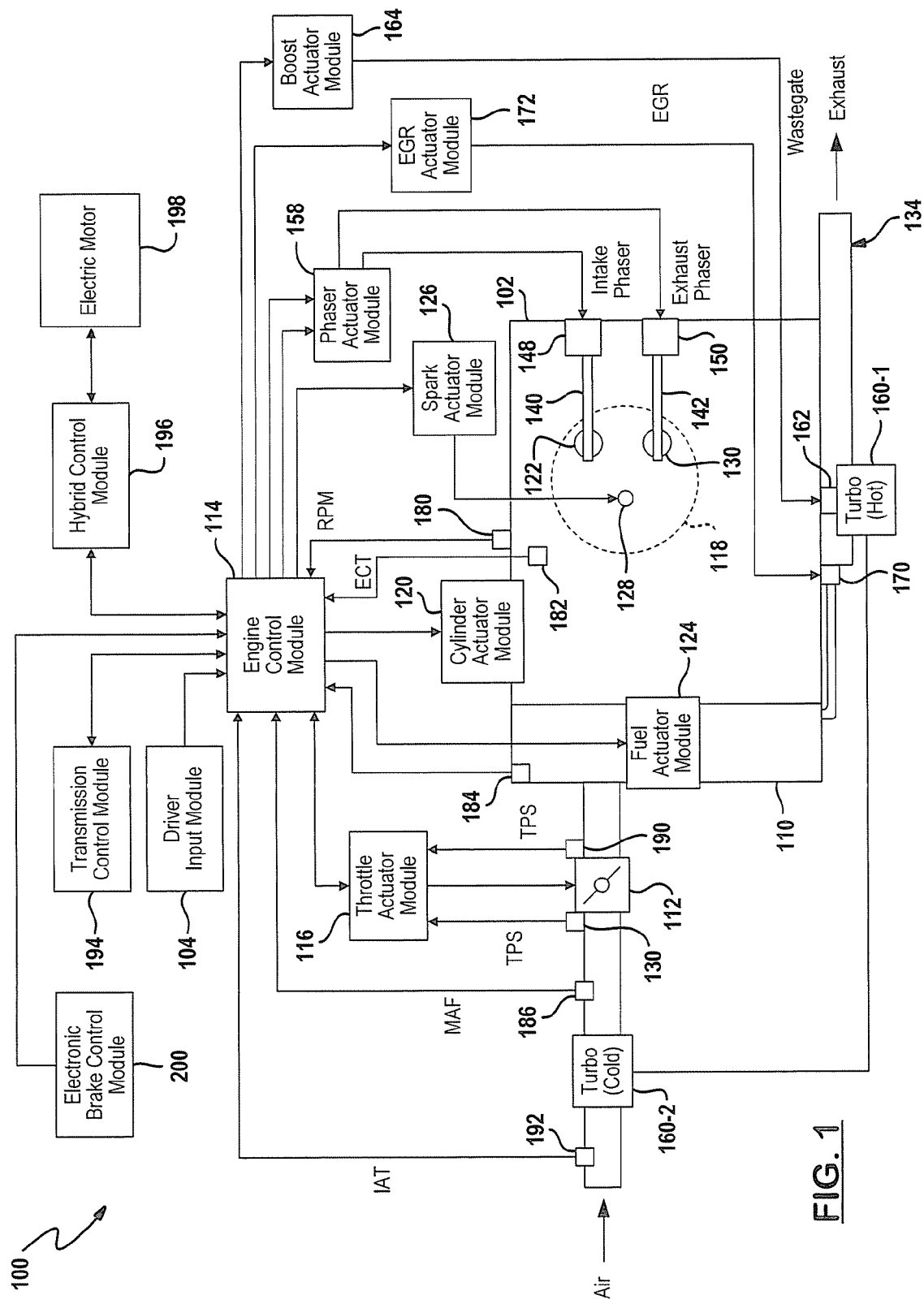
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A waste gate 162 may allow exhaust gas to bypass the turbocharger 160, thereby reducing the boost (the amount of intake air compression) of the turbocharger 160. The ECM 114 controls the turbocharger 160 via a boost actuator module 164. The boost actuator module 164 may modulate the boost of the turbocharger 160 by controlling the position of the waste gate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198. The hybrid control module 196 may control for fuel economy or performance. The vehicle operator may be able to select the mode of operation.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

An electronic brake control module 200 may also communicate with the engine control module 114. Various torques associated with the electronic braking system may be factored into the torque control as will be described below.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

Figure 2:
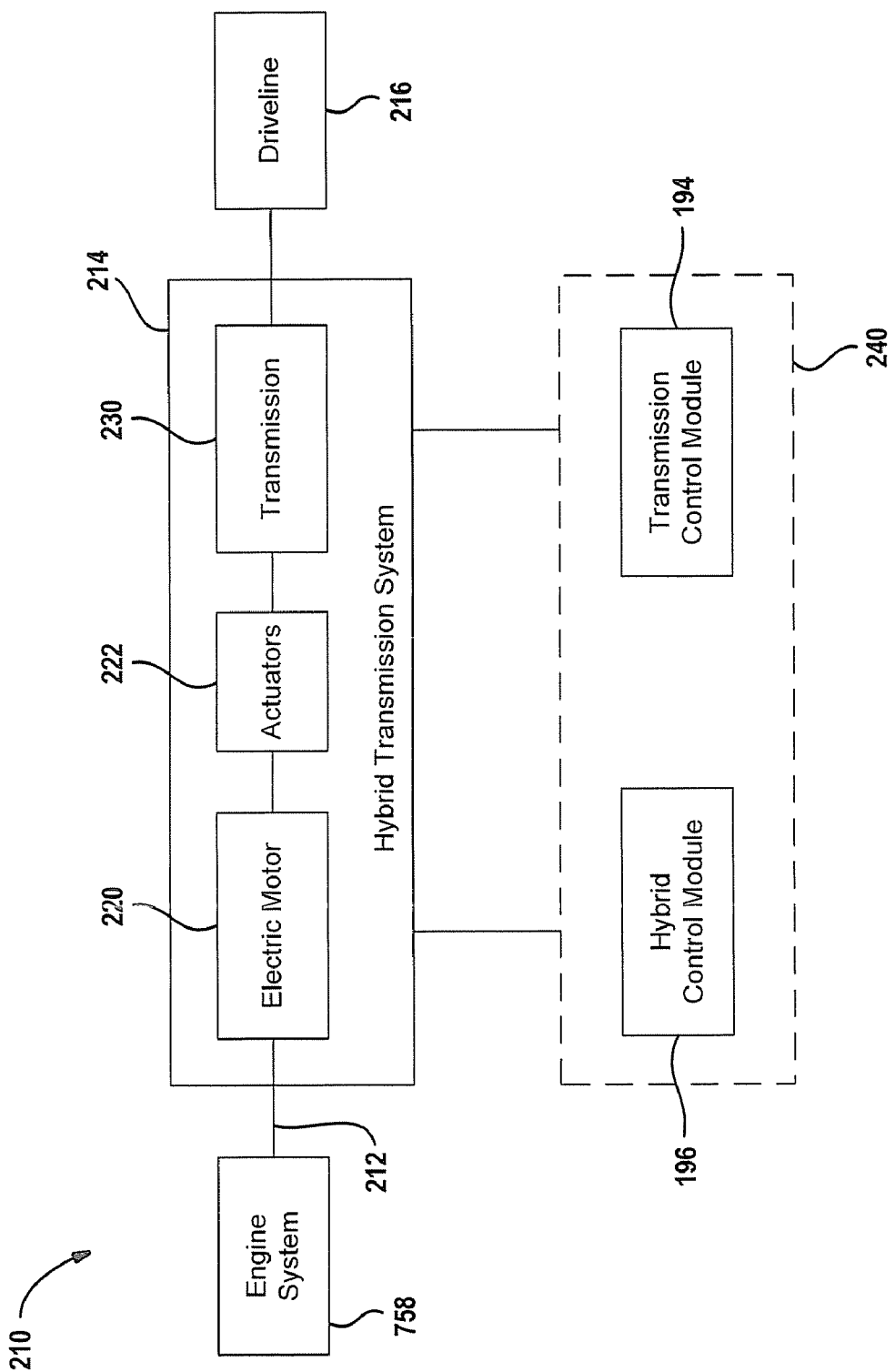
FIG. 2 is a block diagrammatic view of a hybrid vehicle system.

Referring now to FIG. 2, a general block diagrammatic view of a hybrid vehicle 210 is illustrated. The vehicle includes the engine system 100 that includes a crankshaft 212 that is in communication with a hybrid transmission system 214. The hybrid transmission system 214 communicates torque to the wheels of a vehicle through a driveline 216.

The hybrid transmission system 214 includes at least one electric motor 220, actuators 222, which may include clutches or the like for engaging and disengaging gears within a transmission 230. Both the transmission control module 194 and the hybrid control module 196 may be used together to control the hybrid transmission system 214. The transmission control module 194 and the hybrid control module 196 are shown as separate elements in FIGS. 1 and 2. However, the two may be combined as a single control module 240.

Figure 3:
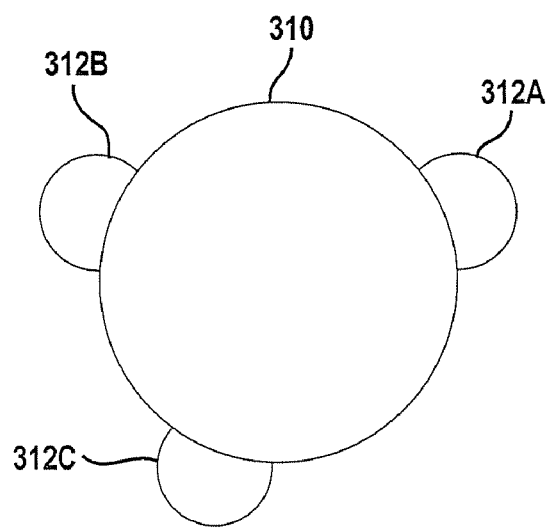
FIG. 3 is an end view of a transmission according to the present disclosure.

Referring now to FIG. 3, an end view of a transmission having a main housing 310 and a plurality of secondary housing 312A, 312B, and 312C. As will be described below, the secondary housings are used for stationary piston assemblies. Three secondary housings are illustrated. However, various members of housings may be provided.

Referring now to FIG. 4, a cutaway view of the hybrid transmission 214 is illustrated. Components of the transmission include a flywheel damper assembly 400 that attaches the transmission to the engine and a transmission portion 402 that includes gears for changing the drive ratio of the transmission. The clutch assembly portion 404 is illustrated in further details. The transmission 214 has a first electric motor 220A and a second electric motor 220B. The motor 220A includes a stator 410A and a rotor 412A. Motor 220B includes a stator 410B and a rotor 412B. The hybrid transmission system 214 also includes a first planetary gear set 414A that includes a ring gear 416A, a sun gear 418A and planetary gears 420A. The gear set 414A is in communication with the transmission shaft 430 through various support components 432.

A second gear set 414B is provided for communicating torque between the electric motor 220B and the transmission shaft 430. The second gear set may also be a planetary gear set that includes a ring gear 416B, a sun gear 418B and planetary gears 420B. The operation of the gear sets 414A and 414B will be further described below.

The hybrid transmission system 214 includes a first clutch assembly 440 and a second clutch assembly 442. The first clutch assembly 440 is used for both starting the engine 102 of FIG. 1 and for operating the transmission 214. The clutch assembly 442 is also used for operating the transmission 214. The first clutch assembly 440 includes a spring 444 that acts upon an actuator or piston 446. The spring 444 pushes the piston 446 away from the clutch pack 448. This is the at-rest position. The clutch pack 448 has disks coupled to a clutch housing 450 and disks 452 in communication with a clutch support 454. The secondary housing 312A includes a pressure port 456 for providing pressure into a cavity formed between the piston 446 and the piston cavity 458. The piston 446 is illustrated in a retracted at-rest position so the cavity is not present. The cavity will be illustrated below in FIG. 5. A seal 460 seals the piston to the cavity 458. When hydraulically charged the piston 446 is moved.

A second piston assembly 470 is illustrated. The second piston assembly 470 includes a spring 472 disposed within a piston cavity 474. The piston cavity 474 also includes a spring cavity 476. The piston cavity 474 includes a fluid port 478 for providing hydraulic fluid into a piston chamber 480 formed between a first piston 482 and a second piston 484. A first seal 486 disposed on the first piston 482 forms a seal within the piston cavity 474. A second seal 488 fluidically seals the piston chamber 480 and the piston 484 between the first piston 482 and the outer wall of the piston cavity 474. The piston 484 is prevented from moving axially toward the motor B by a stop 492.

The spring 472 biases the piston 482 axially to engage the disks 448 and 452 to engage. Extension of the spring and thus the housing is an at-rest condition. As will be described below, engagement of the clutch disks 448 and 452 ultimately allow the gear assembly 414B to provide a starting torque to the engine. Also, the gear assembly 414A also provides an electric starting torque to the transmission shaft 430 for providing starting torque to the engine. A second clutch assembly 500 also includes disks 502 and 504 used for engaging and disengaging various gears in the gear set 414B to provide various drive ratios in a conventional manner. The hydraulically charged position of the piston is away from the clutch.

Referring now to FIG. 5, the piston assembly 470 is illustrated in a retracted position. That is, the piston 482 is retracted from the disks 448. In this embodiment, the piston 486 is retracted axially towards motor 410A by providing hydraulic fluid through the port 478. As the hydraulic fluid chamber 480 expands due to the hydraulic forces therein, the force of the spring 472 is overcome and thus the clutch is in a normal operating position.

The piston 446 is thus allowed to operate the clutch assembly 440 by moving the piston 446 so that the clutch disks 448, 452 engage. The operation of the clutch assembly 440 and 500 allow various drive ratios to be provided by the transmission shaft 430.

In operation, when the engine of the vehicle is not started, the spring 472 pushes the piston 482 into engagement so that the clutch disks 448 and 452 have sufficient friction therebetween. By fixing the clutch support 454 in place, the ring gear 416B is also fixed into position. The sun gear 418B is driven by the motor B and thus torque is provided to the transmission shaft 430. The motor A drives the sun gear 418A so that torque is transmitted to the transmission shaft 430. The torque provided by the motor 220A and motor 220B provides a sufficient amount of torque to start the engine system 100 illustrated in FIG. 2. The hybrid transmission system 214 ultimately couples the transmission shaft 430 to the crankshaft 212 of the engine system 100.

After the engine 100 is started, hydraulic fluid is provided through the port 478 to provide a sufficient hydraulic pressure between the pistons 482 and 484 to overcome the force of the spring 472 and thus allow the piston 482 to disengage the disks 448, 452. The clutches 440 and 500 thereafter are allowed to operate the transmission and the gearing in a desired manner.

A third piston assembly 510 is illustrated having a spring 512 that pushes pistons 514 and 516 apart. Hydraulic fluid enters a chamber through a port 518 to move the piston 516 into engagement with the clutch assembly 500. The piston 514 remains stationary while the piston 516 moves axially.

Figure 6:
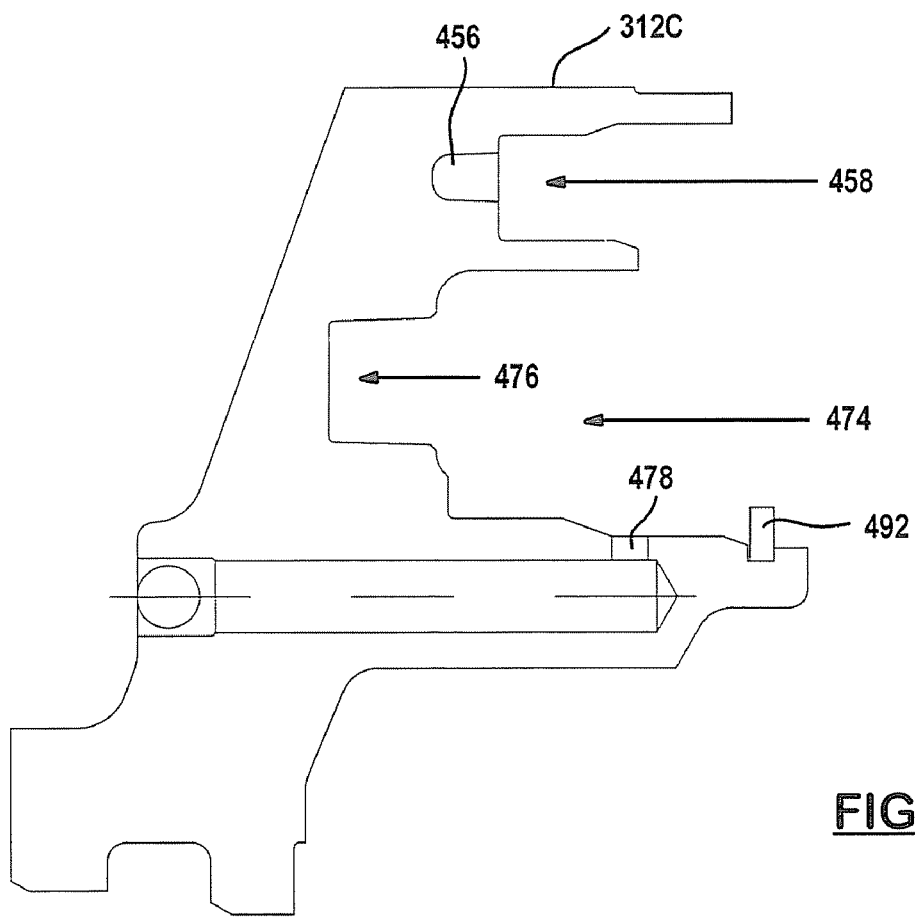
FIG. 6 is a cross-sectional view of a secondary housing according to the present disclosure.

Referring now to FIG. 6, a side view of the secondary housing 312 is illustrated in further detail. This view is provided to illustrate the relative positions of the first piston cavity 458 and the second piston cavity 474. The housing 312 may be located using dowel pins or other locating methods. The dowel pins may be located on the main housing 310 or the secondary housing 312. The dowel pins, not shown, transfer the torque and the thrust load created when the clutch is applied. By providing the clutch assembly illustrated, increased clutch capacity with the same transmission boundary conditions may be provided. Also, a reduced number of clutch plates or disks are provided in the clutch packs 440 and 500. Spin loss is also reduced while increasing the fuel efficiency of the vehicle. Also, the additional housing allows three pistons to be stacked radially decreasing the transmission length.

Figure 7:
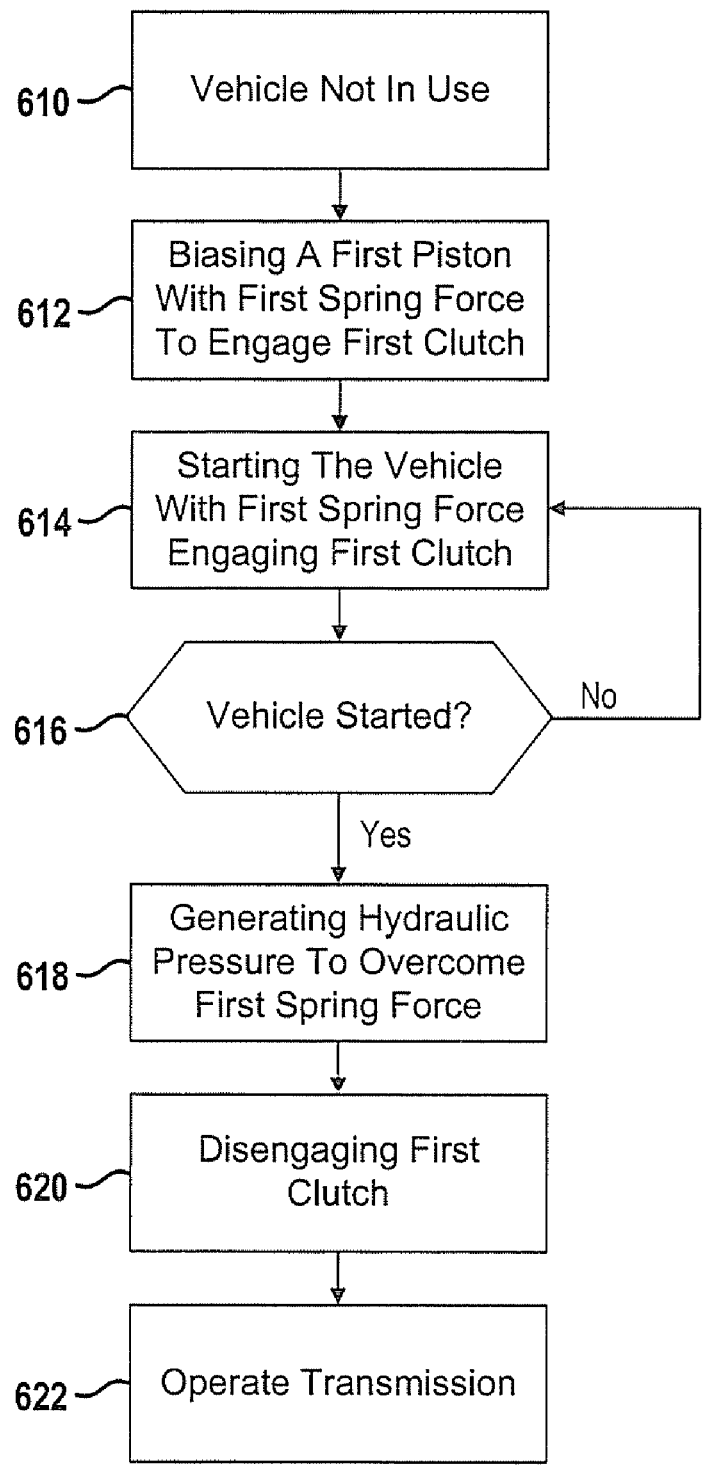
FIG. 7 is a flowchart of a method for starting a hybrid vehicle using the hybrid transmission.

Referring now to FIG. 7, a method for operating a hybrid vehicle is set forth. In step 610, the vehicle is not in use, meaning that the engine is not started. In step 612, the first piston is biased with a first spring torque force to engage the first clutch against a first clutch pack. This essentially prevents the clutch support 454 from moving. A sufficient spring force is provided to prevent the clutch support from moving and therefore the second motor is in communication with the transmission shaft 430 of FIGS. 4 and 5. Thus, the at-rest position is with the clutch engaged. In step 614, the vehicle is started with the first spring force engaging the disks 448, 452 of the first clutch 440. In step 616, when the vehicle is not started, step 614 is again performed in which the first spring force is engaged with the first clutch. When the vehicle is started in step 616, step 618 generates hydraulic pressure to overcome the first spring force. The hydraulic pressure is provided between the first piston 482 and the second piston 484 into the hydraulic chamber 480. Enough hydraulic fluid is provided to overcome the spring force and thus retract the piston 482 from engagement with the clutch disks so that the clutch disks 448 and 452 of FIGS. 4 and 5 turn freely. This engagement of the clutch is performed in step 620.

In step 622, the transmission is operated in a normal manner. That is, the piston 446 engages and disengages the first clutch 440 and the second piston 516 engages and disengages the clutch assembly 500. By controlling the clutches in a conventional manner, the gear ratio of the transmission shaft 430 may be changed relative to an input shaft of the transmission.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A clutch assembly comprising:
   a first clutch disk;
   a first clutch actuator for selectively engaging the first clutch disk, said first clutch actuator having a first at-rest position engaging the first clutch disk and a first hydraulically-charged position disengaged from the first clutch disk; and
   a second clutch actuator having a second at-rest position away disengaged from the first clutch and a second hydraulically-charged position engaged with the first clutch disk, wherein the first clutch actuator contacts the first clutch disk independent from the second clutch actuator.

2. A clutch assembly as recited in claim 1 wherein the first clutch actuator comprises a first spring, said first spring positioning the first clutch actuator to the first at-rest position.

3. A clutch assembly as recited in claim 2 wherein the first at-rest position corresponds to an engine starting position.

4. A clutch assembly as recited in claim 1 wherein the first clutch actuator comprises a first piston and a first spring, said first spring biasing the piston to the at-rest position.

5. A clutch assembly as recited in claim 1 wherein the second clutch actuator comprises a second spring, said second spring positioning the second actuator to the second at-rest position.

6. A clutch assembly as recited in claim 1 wherein the second clutch actuator comprises a second piston and a second spring, said second spring biasing the piston to the at-rest position.

7. A clutch assembly as recited in claim 6 wherein the second at rest position corresponds to an engine starting position.

8. A clutch assembly as recited in claim 1 further comprising a second clutch and a third clutch actuator engaging the second clutch.

9. A transmission assembly comprising:
   a clutch assembly as recited in claim 1;
   a transmission shaft; and
   a plurality of gears selectively coupled to the transmission shaft by the clutch assembly.

10. A transmission assembly as recited in claim 9 comprising:
    a first electric motor; and
    a second electric motor.

11. A transmission assembly as recited in claim 10 wherein the clutch assembly is disposed axially between the first electric motor and the second electric motor.

12. A hybrid vehicle comprising:
    an engine; and
    the transmission of claim 11 disposed within the first housing.

13. A hybrid vehicle as recited in claim 12 wherein the first clutch actuator comprises a first spring, said first spring biasing the first clutch actuator toward said first clutch disk to start the engine.

14. A hybrid vehicle as recited in claim 12 wherein the first clutch actuator is hydraulically biased away from the first clutch disk after the engine started.

15. A method of starting a vehicle having an engine comprising:
    engaging a first clutch disk in a transmission with a first clutch actuator when the engine is not started;
    starting the engine;
    generating a hydraulic force to move the first clutch actuator after starting the engine; and operating the transmission by selecting engaging the first clutch disk with a second clutch actuator, said first clutch actuator having an at-rest position in which the first clutch actuator contacts the first clutch disk independent from the second clutch actuator.

16. A method as recited in claim 15 wherein engaging a first clutch disk comprises engaging the first clutch disk with a piston positioned by a spring force.

17. A method as recited in claim 16 wherein generating a hydraulic force comprises generating the hydraulic force to overcome the spring force after the engine is started.

18. A method as recited in claim 16 wherein in response to the hydraulic force, disengaging the piston from the first clutch disk.

19. A method as recited in claim 16 wherein starting the engine comprises starting the engine with a motor located in transmission housing with the first clutch disk.

20. A method as recited in claim 16 further comprising operating the transmission with the first clutch disk and a second clutch after disengaging the first clutch disk.

* * * * *